Oct. 12, 1965 C. B. ALLER Re. 25,881

DUCTOR ROLLER FOR USE IN DISTRIBUTION ROLLER SYSTEMS FOR LIQUID AND SEMI-LIQUID SUBSTANCES

Original Filed Oct. 24, 1958 3 Sheets-Sheet 1

Inventor:
Claes Borge Aller
By:
Baldwin & Wight
his Attorneys

Inventor:
Claes Borge Aller
By:
Baldwin & Wight
his Attorneys

DUCTOR ROLLER FOR USE IN DISTRIBUTION ROLLER SYSTEMS FOR LIQUID AND SEMI-LIQUID SUBSTANCES

Original Filed Oct. 24, 1958 3 Sheets-Sheet 3

Inventor:
Claes Borge Aller
By:
Baldwin & Wight
his Attorneys

United States Patent Office

Re. 25,881
Reissued Oct. 12, 1965

25,881

DUCTOR ROLLER FOR USE IN DISTRIBUTION ROLLER SYSTEMS FOR LIQUID AND SEMI-LIQUID SUBSTANCES

Claes B. Aller, deceased, late of Copenhagen, Denmark, by Edith Aller, legatee, Copenhagen, Denmark, assignor to Carl Allers Etablissement A/S, Copenhagen, Denmark Original No. 3,037,449, dated June 5, 1962, Ser. No. 769,480, Oct. 24, 1958. Application for reissue June 3, 1964, Ser. No. 382,982

Claims priority, application Great Britain, Jan. 21, 1958, 2,043/58

11 Claims. (Cl. 101—350)

Figure 1:
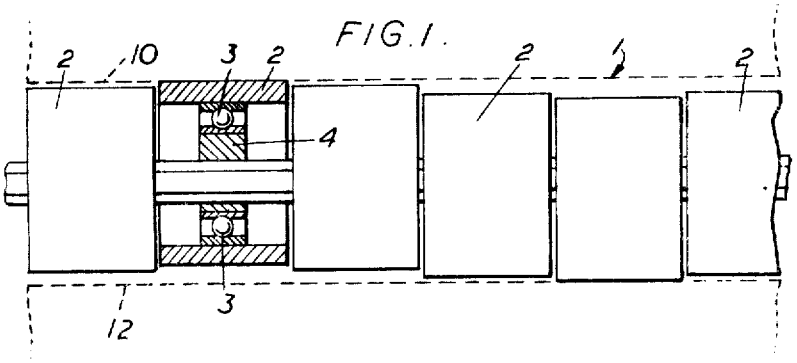

Matter enclosed in heavy brackets [ ] appears in the original patent but forms no part of this reissue specification; matter printed in italics indicates the additions made by reissue.

This invention is concerned with roller systems for distributing a liquid or semi-liquid substance from a zone of supply to a zone of use: such systems commonly employ a free running ductor roller which is constantly moved to-and-fro laterally between a supply roller and a receiving roller forming part of the distribution so that the peripheral surface of the ductor roller when in one position receives a charge of the substance from the periphery of the supply roller and in another position transfers that charge (or some of it) to the periphery of the receiving roller whence the material passes on to the zone of use through the distribution rollers.

The use of such a ductor roller has the advantage that the quantity of the substance passed on through the distribution system is a function of the time during which the surface of the ductor roller is presented first to the surface of the feed roller and then to the surface of the supply roller: the supply roller is usually rotated at a slow surface speed and the receiving roller is usually rotated at a relatively high surface speed with the result that the ductor roller, which tends to be driven first by the supply roller and then by the receiving roller, is subjected to severe frictional wear by reason of its own inertia: the surface of the ductor roller therefore tends to deteriorate more or less rapidly and to cause uneven distribution of the substance.

This defect is especially serious in cases where the rollers are of substantial length as occurs for example in the ink distribution system of a printing machine: by reason of the length of the rollers, the ductor roller has to be made with sufficient mechanical strength to withstand the lateral loading to which it is subjected and hence the mass and the inertia effect is correspondingly high: the wear to which the surface of the ductor roller is subjected in such a case is especially serious in modern high speed printing machines since the difference in surface speeds of the supply roller, usually taking its ink from an ink fountain, and the receiving roller is very large: the same consideration applies to the damping roller system of a lithographic printing machine.

It is the main object of the present invention to provide a ductor roller which will enable the defect referred to to be avoided.

According to the present invention, the effective length of a ductor roller is formed by a number of freely rotatable sections and the sections are moved out of phase with one another in recurring cycles laterally from contact with the supply roller to contact with the receiving roller: at any moment, therefore, one section is in surface contact with the supply roller, another section is in surface contact with the receiving roller, and another (or other) section (or sections) is (or are) moving either towards the supply roller or the receiving roller. In this way, the inertia effect is considerably reduced for the acceleration or deceleration of the ductor roller is no longer required to be of the whole length (and therefore mass) of the ductor roller at once, but only of the sections as they individually make contact alternately with the supply and feed rollers.

The sections of such a ductor roller can be operated so that all the sections making up the effective length of the roller are moved in different phases or they can be arranged in groups having the same or a different phase but with the individual sections of the groups essentially having different phases, *that is, the sections will have out-of-phase relationships.* It will be obvious that the transfer of the substance from the ductor roller to the receiving roller will be effected in a "pattern" along the length of and circumferentially around the receiving roller and the pattern will depend on the relative phasing of the various sections and of the various groups.

The means for achieving the lateral movement of the sections can take various forms: a particularly simple but effective form consists in constructing each section as a ring rotatably mounted on an inner ring: the inner ring has an eccentric bore or is mounted on a support with an "off-centre" bore; the arrangement enables the assembly to be passed on to a shaft to which the inner rings are connected in different angular settings to correspond with the different phasing required for the various sections: the shaft is turned at a rate corresponding to the desired time period of the operating cycles and the various sections will be moved by the eccentricity in the required phasing: the driving to the shaft could be effected through a variable speed gear so that the cycle time periods can be varied to suit requirements.

Figure 2:
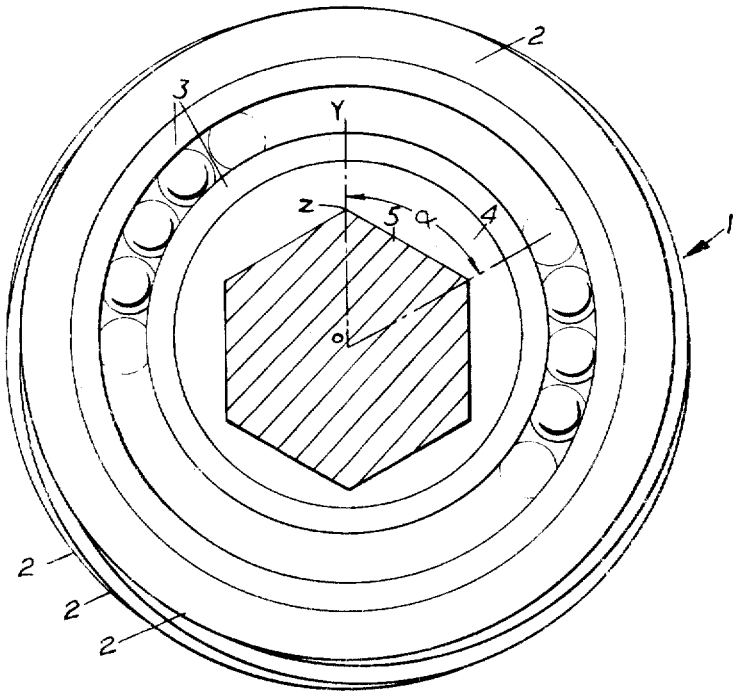
Figure 3:
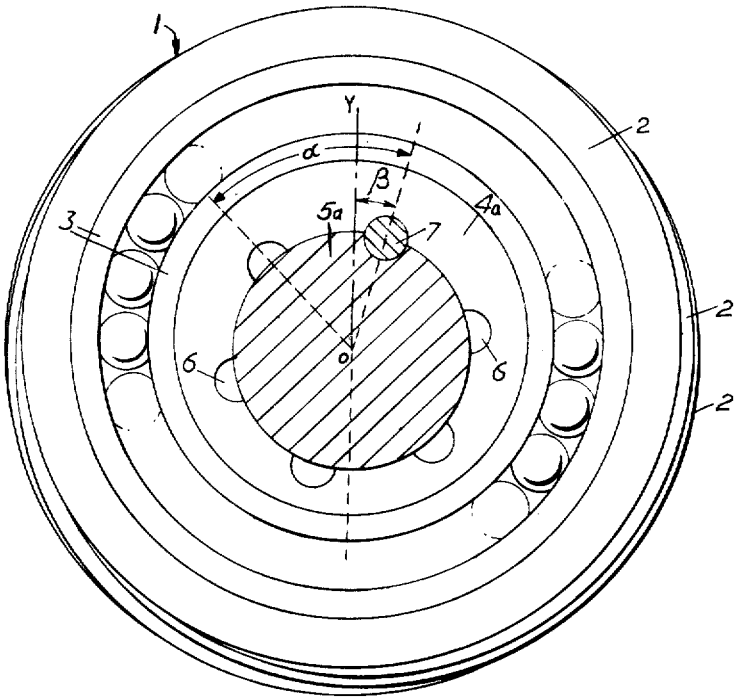
Figure 4:
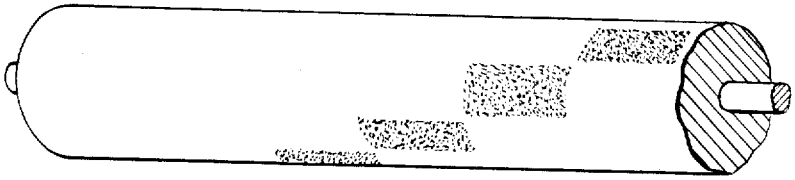
Figure 5:
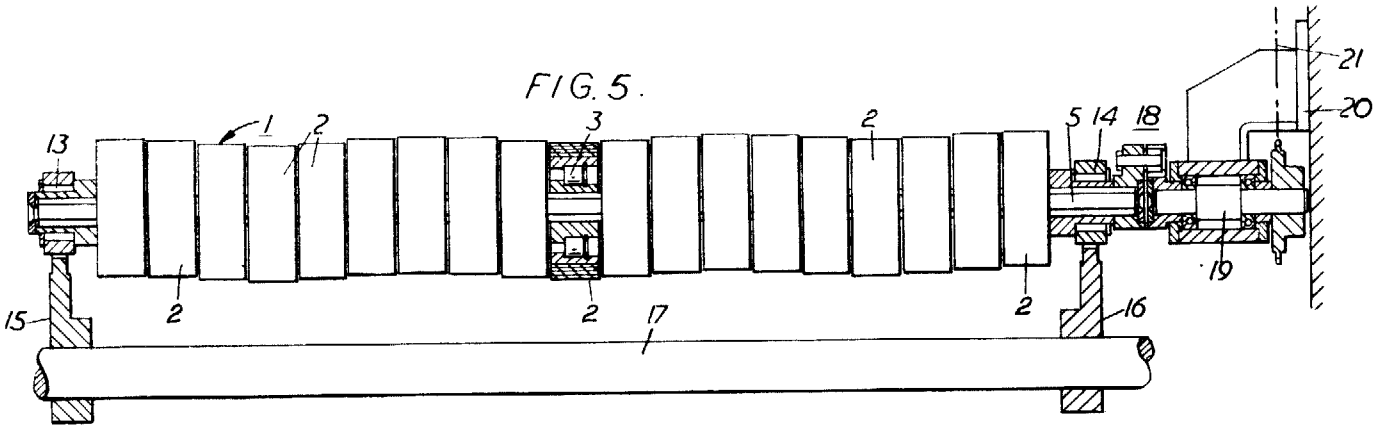
Figure 6:
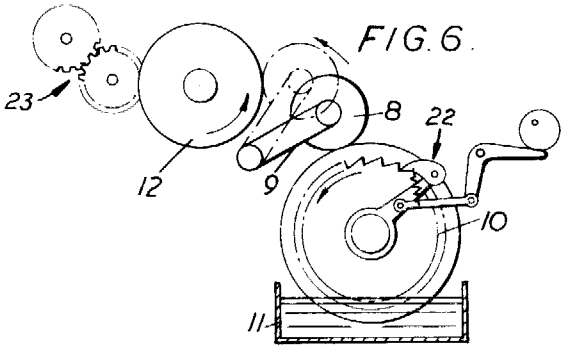
Figure 7:
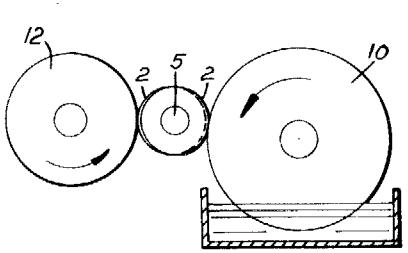

The invention will now be further described with reference to the accompanying drawings, in which FIGURE 1 is a side elevation partly in section showing a part of a ductor roller according to the invention; FIGURE 2 is a cross-section of the roller shown in FIGURE 1 to a larger scale; FIGURE 3 is a view similar to FIGURE 2 of a modified construction; and FIGURE 4 is a perspective view of a receiving roller showing diagrammatically one pattern of inked areas applied to the receiving roller by the ductor roller according to the invention. FIGURE 5 is a longitudinal sectional elevation showing a ductor roller assembly according to this invention as it would be incorporated in the inking mechanism of a rotary printing machine, FIGURE 6 is a diagrammatic view of [such] an inking mechanism as it is normally arranged *according to the prior art,* and FIGURE 7 is a diagrammatic view similar to FIGURE 6 [5], but showing inking mechanism arranged in accordance with this invention.

Referring to FIGURES 1–5 of the drawings, the ductor roller 1 according to this invention comprises a number of sections 2 each in the form of an outer ring supported by being journalled for free rotation on a ball or roller bearing 3 the inner [face] *race* of which is itself fast on an inner ring 4. The inner ring has an eccentric opening to enable the sections 2 to be passed into position on *a support, as shown* a shaft 5, the assembly of sections in end-to-end relation on the shaft forming the ductor roller 1.

In the construction shown in FIGURE 2, the shaft 5 has a polygonal cross-section and each of the inner rings 4 has a correspondingly shaped opening which is eccentric to the centre of the ring and hence of the outer ring 2 supported by that ring 4. In threading the sections onto the shaft 5, the angular relationship of the various sections 2 (and hence their relative phases) is determined by turning the successive rings 4 through an angle $\alpha$ to bring their various faces into register with those of the shaft 5. *Thus, the eccentrics 4 and the shaft 5 are formed to interlock at angular positions which differ at different points lengthwise of the shaft.*

In the modified construction shown in FIGURE 3, the eccentric opening of each of the rings 4[a] is formed with series of half-round recesses 6 which can pass on to *and interlock with* a key 7 secured to the *support or* shaft 5[a]; in this case also, the relative phasing of the various sections is selected by turning the inner rings 4[a] about the axis of the shaft 5[a] to bring one or other of their recesses 6 into register with the key 7. In FIGURE 2, the line OY eccentricity passes through one of the apices Z of the polygonal opening in the ring 4. The same result of adjustment in the relative phasing of the sections would be obtained in FIGURE 3 by locating one of the recesses 6 on the line OY of eccentricity: however, as shown in FIGURE 3, the recesses 6 are displaced through an angle $\beta$ as compared with the apices of the polygon shown in FIGURE 2. This angle $\beta$ represents an angular offset between the key and recess 7 and 6 and the point of greatest radius on the eccentric ring 4[a] as shown in FIGURE 3 where the line OY intersects the outer circumference of the eccentric ring 4[a]. In this way, a greater number of different angular positions of the eccentric rings 4[a] is possible by reversing the presentation of the rings when threading them on the shaft. For example, it can be readily seen from FIGURE 3 that if the eccentric ring 4[a] is removed from the shaft 5[a], reversed so that the surface facing one way as shown is made to face the opposite way, and then replaced on the shaft 5[a] with the same recess 6 mated with the same key 7, the point of greatest radius will have been displaced an amount $2\beta$ and will lie $\beta$ degrees to the other side of the key 7 as shown in FIGURE 3. This total change in angular displacement of the eccentric ring 4[a] $2\beta$ is less than the angle $\alpha$.

The various sections 2 having been mounted on the shaft 5 (or 5[a]) in the required angular relationship to set their phasing, the shaft is rotated at a speed which determines the time period of the cycle in which each of the sections 2 is moved laterally firstly to contact the supply roller and then to contact the receiving roller.

The action will be more easily understood by reference to FIGURE 6: this figure shows a normal i.e. prior art, arrangement in which a ductor roller indicated at 8 is rotatably mounted on an arm 9 which is rocked backwards and forwards; this action brings the roller 8 first into contact with a fountain roller 10 which is moved slowly, as by a pawl and ratchet mechanism as indicated at 22, in a pool of ink in a fountain 11 and then into contact with a roller 12 of an ink distributing roller system, this roller 12 rotating at high speed being driven as by gearing 23 from the machine being supplied. Such a fountain roller and distribution roller system is in very wide use and further description is therefore believed to be unnecessary. In this usual arrangement the whole length of the ductor roller 8 engages first the slow speed roller 10 and then the high speed roller 12: the whole mass of the roller has therefore to be accelerated and decelerated at once in each cycle of vibration of the roller 8 with the detrimental result already referred to.

However, *as shown in FIGURE 7,* by replacing the roller 8 by the multisection ductor roller 1 of the present invention, only a fractional part of the total mass of the roller has to be accelerated or decelerated at any one time, the fractional part depending on the number of sections 2 which simultaneously touch either the fountain roller 10 or the distribution roller 12: as the sections 2 play no part in affording the required lateral strength of the roller assembly (this being provided by the shaft 5, or 5[a]), they can be relatively light and so have little inertia to be overcome when they are accelerated and decelerated. Thus although the total mass of the roller 1 may well equal that of the normal construction, the action is now spread over the whole time of the cycle of operation and is distributed lengthwise of the roller 1 so that the acceleration and deceleration is achieved in steps each of low intensity with the benefits referred to.

In FIGURE 5 is shown a practical assembly: in this figure, the ductor roller is of the form shown in FIGURES 1 and 2; the shaft 5 carrying the roller sections 2 is mounted at each of its ends in bearings 13, 14 carried by arms 15, 16 on a shaft 17; one end of the shaft 5 is connected through a shear pin arrangement 18, to a drive spindle 19 mounted in a fixed bracket 20; the spindle 19 is driven by a chain transmission 21 so as to *move, in the form shown to* rotate the shaft 5 *angularly about its axis* at a slow speed and in this way to move the various roller sections 2 into and out of engagement with the slow speed fountain rollar 10 and the high speed distribution roller 12 in the manner already described.

What is claimed is:

1. A ductor roller assembly which comprises a shaft, means supporting the shaft for angular movement about its axis, a series of eccentrics on the shaft and arranged at different angular settings about the axis of the shaft, and a series of cylindrical liquid transfer roller sections which are mounted respectively for free rotation on the eccentrics in [continguous] *contiguous* end-to-end relation.

2. A ductor roller assembly as claimed in claim 1 and wherein the various eccentrics are formed separately from the shaft, the shaft and the eccentrics being formed to interlock at angular positions which differ at different points lengthwise of the shaft.

3. A roller distribtuion system comprising at least two driven rollers which are spaced apart and are driven to have different surface speeds, and a ductor roller assembly disposed adjacent the said two driven rollers, the said ductor roller assembly comprising a number of sections, means mounting said sections in end-to-end relation for free independent rotation about axes offset from each other, and means for *angularly* [shifting] *moving* said mounting means to move the sections transversely of the length of the roller assembly to bring the peripheral surfaces of said sections into contact alternately with the two driven rollers, the said mounting and *moving* [shifting] means *comprising means for effecting* [cooperating to effect the] transverse movement of the sections *relative to one another in out-of-phase* [in different phase] relationships whereby sections at different points along the length of the roller assembly contact the two driven rollers at different times.

4. A roller distribution system comprising two driven rollers which are spaced apart and are driven to have different surface speeds and a ductor roller assembly disposed adjacent the two driven rollers, the said ductor roller assembly comprising a number of sections mounted in end-to-end relation for free independent rotation about axes offset from each other, and means to move the sections transversely of the length of the ductor roller assembly *relatively to one another* in recurring cycles in which the [transeverse] *transverse* movements of the various sections have *out-of-phase* [different phase] relationships whereby the sections are moved into contact with the two driven rollers in alternation but at different times in the operating cycle.

5. A roller distribution system comprising two driven rollers which are spaced apart, means to drive the driven rollers so that they have different surface speeds and a ductor roller assembly to transfer matter from the surface of one of said driven rollers to the surface of the other of said driven rollers, the said ductor roller assembly comprising a support, means to move the support angularly about its axis, a series of eccentrics on *and surrounding the axis of said support* and spaced along the length of the support and a series of roller sections mounted for free rotation on the eccentrics whereby movement of the support moves the sections into surface contact with the said two driven rollers alternately and at different times in the operating cycle of the support.

6. A roller distribution system comprising two driven rollers which are spaced apart, means to drive the driven rollers so that they have different surface speeds and a ductor roller assembly to transfer matter from the surface of one of said driven rollers to the surface of the other of said driven rollers, the said ductor roller assembly comprising a support, means operated synchronously with the drive to the driven rollers to move the support angularly about its axis, a series of eccentrics on *and surrounding the axis of said support* and spaced along the length of the support and a series of roller sections mounted for free rotation on the eccentrics whereby movement of the support moves the sections into surface contact with the said two driven rollers alternately and at different times in the operating cycle of the support.

7. In a printing machine, an ink supply system comprising an ink supply roller, an ink distribution roller, means to drive said rollers so that they have different surface speeds, and means to transfer ink from the supply roller to the distribution roller, the said transfer means comprising a ductor roller assembly formed of a number of sections and means mounting said sections in end-to-end relation for free independent rotation about axes offset from each other *and for movements relative to one another transverse to said axes, whereby during rotation* [whereby] said sections are in *out-of-phase* [different phase] relationship, and means for [shifting] *moving* said mounting means whereby said sections alternately engage the supply and distribution rollers.

*8. A ductor roller assembly which comprises a shaft means; means supporting said shaft means for angular movement about its axis; a plurality of eccentrics on said shaft means and arranged at different angular settings about the axis of said shaft means; and a plurality of cylindrical liquid transfer roller sections mounted respectively for free rotation on said eccentrics in substantially contiguous end-to-end relation.*

*9. In a roller distribution system having a first roller which receives matter to be distributed by said system, a second roller for delivering said matter from said system, and a ductor roller assembly for transferring matter from said first roller to said second roller, the improvement which comprises that said ductor roller assembly includes a plurality of cylindrical transfer roller sections; bearing means mounting said roller sections in substantially contiguous end-to-end relation with one another between said first and second rollers and for free independent rotation about section axes substantially parallel to the roller axes of said first and second rollers, said section axes being offset from each other transversely to said section axes and said roller axes; and means for moving said bearing means to vary the offset positions of said section axes, whereby said roller sections are movable during rotation transversely to the axes of said first and second rollers in recurring cycles for transferring said matter from said first roller to said second roller by each of said roller sections during each of said cycles.*

*10. In a roller distribution system having a first roller which receives matter to be distributed by said system, a second roller for delivering said matter from said system, and a ductor roller assembly driven by one of said first and second rollers for transferring matter from said first roller to said second roller, the improvement which comprises that said ductor roller assembly includes a plurality of cylindrical transfer roller sections separately drivable by said one of said first and second rollers; bearing means mounting said roller sections for independent free rotation in substantially contiguous end-to-end relation with one another between said first and second rollers, said bearing means comprising a plurality of bearings individually eccentrically mounting the respective roller sections with their eccentricities offset with respect to one another transversely to the axes of said bearings and transversely to the axes of said roller sections; and means for moving said bearings transversely to their axes whereby during rotation of said roller sections and movement thereof transversely to their axes said roller sections will be rotated into and out of matter picking up relation to said first roller in out-of-phase relations.*

*11. In a roller distribution system having driving mechanism, a first roller which receives matter to be distributed by said system, a second roller for delivering said matter from said system, and a ductor roller assembly driven by one of said first and second rollers for transferring matter from said first roller to said second roller, the improvement which comprises that said ductor roller assembly includes a plurality of cylindrical transfer roller sections separately drivable by said one of said first and second rollers; bearing means mounting said roller sections for independent free rotation in substantially contiguous end-to-end relation with one another between said first and second rollers, said bearing means comprising a plurality of bearings individually eccentrically mounting the respective roller sections with their eccentricities offset with respect to one another; and means operable by said driving mechanism for moving said bearing means to vary the positions of eccentricity thereof about the bearing means axes, whereby said roller sections are movable transversely with respect to the axes of said first and second rollers in recurring cycles in which the transverse movements of the different roller sections have out-of-phase relations.*

References Cited by the Examiner

The following references, cited by the Examiner, are of record in the patented file of this patent or the original patent.

UNITED STATES PATENTS

| | | | |
|---|---|---|---|
| 1,435,185 | 11/22 | Skerl | 101—66 X |
| 1,491,721 | 4/24 | Munson | 74—594 X |
| 1,717,737 | 6/29 | Schlesinger | 101—350 |
| 1,869,022 | 7/32 | Phare | 101—93 |
| 1,945,631 | 2/34 | Fankboner | 101—350 |
| 1,982,830 | 12/34 | Richter | 101—365 X |
| 2,181,798 | 11/39 | Blackley | 101—348 X |
| 2,356,010 | 8/44 | Seymour | 101—348 |
| 2,737,886 | 3/56 | Ruppel | 101—351 |

FOREIGN PATENTS

| | | |
|---|---|---|
| 817,840 | 10/51 | Germany. |
| 168,173 | 9/21 | Great Britain. |

EUGENE R. CAPOZIO, *Primary Examiner.*